United States Patent
Lee et al.

(10) Patent No.: US 7,538,253 B2
(45) Date of Patent: May 26, 2009

(54) METHOD FOR PREPARING CATALYST FOR PARTIAL OXIDATION OF METHYLBENZENES

(75) Inventors: Won Ho Lee, Daejeon (KR); Dong Il Lee, Gyeonggi-do (KR); Jong Hyun Chae, Daejeon (KR); Hyun Kyung Yoon, Seoul (KR)

(73) Assignee: LG Chem Ltd., Seoul (KR)

( * ) Notice: Subject to any disclaimer, the term of this patent is extended or adjusted under 35 U.S.C. 154(b) by 0 days.

(21) Appl. No.: 11/602,324

(22) Filed: Nov. 21, 2006

(65) Prior Publication Data
US 2007/0117717 A1 May 24, 2007

(30) Foreign Application Priority Data
Nov. 22, 2005 (KR) ............... 10-2005-0111833

(51) Int. Cl.
*B01J 31/00* (2006.01)
*B01J 23/00* (2006.01)
*B01J 21/00* (2006.01)
*C07C 45/00* (2006.01)
*C07C 31/13* (2006.01)

(52) U.S. Cl. .............. 568/431; 568/432; 568/434; 502/35; 502/308; 502/309; 502/350; 502/439

(58) Field of Classification Search ........... 502/305, 502/308, 309, 178, 350, 439; 568/431, 432, 568/434
See application file for complete search history.

(56) References Cited

U.S. PATENT DOCUMENTS

| | | | |
|---|---|---|---|
| 3,845,137 A | | 10/1974 | Magder |
| 4,017,547 A | | 4/1977 | Simmons et al. |
| 4,196,102 A | * | 4/1980 | Inooka et al. ........... 502/62 |
| 4,269,737 A | * | 5/1981 | Grenoble et al. ........... 502/204 |
| RE31,039 E | * | 9/1982 | Inooka et al. ........... 502/242 |
| 4,374,293 A | | 2/1983 | Burrington et al. |
| 4,454,105 A | * | 6/1984 | Wada et al. ........... 423/440 |
| 4,504,681 A | * | 3/1985 | Armor ........... 564/267 |
| 4,522,936 A | * | 6/1985 | Kukes et al. ........... 502/249 |
| 4,833,112 A | * | 5/1989 | Przydrozny et al. ........... 502/304 |
| 4,833,113 A | | 5/1989 | Imanari et al. |

(Continued)

FOREIGN PATENT DOCUMENTS

JP 47-002086 1/1972

(Continued)

*Primary Examiner*—Cam N. Nguyen
(74) *Attorney, Agent, or Firm*—McKenna Long & Aldridge LLP

(57) ABSTRACT

The present invention relates to a novel method for preparing a catalyst of the formula (1), WOx wherein, W represents tungsten atom, O represents oxygen atom x represents a value determined by oxidative state of W, for partial oxidation of methylbenzenes, the method comprising: (a) a step of preparing tungsten oxide slurry by wet milling; (b) a step of supporting the slurry obtained in the step (a) on fire-resistance inorganic carrier by impregnation; (c) a step of drying the catalyst obtained in the step (b); and (d) a step of calcining the dried catalyst obtained in the step (c), and can reduce the reaction temperature on the basis of equivalent yield in the preparation of corresponding aromatic aldehyde from methylbenzenes since the catalyst has increased the surface areas compared to the conventional one, and thus has high conversion rate.

7 Claims, 2 Drawing Sheets

U.S. PATENT DOCUMENTS

| | | | |
|---|---|---|---|
| 4,929,586 A * | 5/1990 | Hegedus et al. | 502/217 |
| 5,116,801 A * | 5/1992 | Luck | 502/307 |
| 5,137,855 A * | 8/1992 | Hegedus et al. | 502/84 |
| 5,229,347 A * | 7/1993 | Prada et al. | 502/221 |
| 5,307,792 A * | 5/1994 | Takahashi et al. | 123/65 A |
| 5,324,702 A | 6/1994 | Yoo et al. | |
| 5,753,582 A * | 5/1998 | Garcin et al. | 502/323 |
| 5,981,426 A * | 11/1999 | Langford et al. | 502/309 |
| 6,037,306 A * | 3/2000 | Xia et al. | 502/315 |
| 6,120,747 A * | 9/2000 | Sugishima et al. | 423/240 S |
| 6,458,737 B1 * | 10/2002 | Kishimoto et al. | 502/113 |
| 6,793,875 B1 * | 9/2004 | Shaw et al. | 419/18 |
| 6,870,014 B2 * | 3/2005 | Steinbrenner et al. | 526/90 |
| 2002/0188159 A1 | 12/2002 | Kishimoto et al. | |
| 2003/0186806 A1 * | 10/2003 | Steinbrenner et al. | 502/305 |
| 2006/0094906 A1 | 5/2006 | Lee et al. | |

FOREIGN PATENT DOCUMENTS

| | | |
|---|---|---|
| JP | 48-47830 | 7/1973 |
| JP | 2001-198464 | 7/2001 |
| KR | 10-2006-0040147 | 5/2006 |

\* cited by examiner

US 7,538,253 B2

METHOD FOR PREPARING CATALYST FOR PARTIAL OXIDATION OF METHYLBENZENES

This application claims priority to Korean Application 10-2005-0111833 on Nov. 22, 2005, which is incorporated by reference, as if fully set forth herein.

TECHNICAL FIELD

The present invention relates to a method for preparing a catalyst for partial oxidation of methylbenzenes. Specifically, the present invention relates to a novel method for preparing a catalyst which can lower the reaction temperature based on equivalent yield in the process for preparing corresponding aromatic aldehydes from methylbenzenes.

BACKGROUND ART

Aromatic aldehydes have aldehyde groups having high reactivity, and so have a wide range of usages. Especially, terephthalaldehyde having two aldehyde groups at para position has received an attention as raw material for medicinal products, agrochemicals, pigments, liquid crystal polymers, or plastic having heat resistance.

Conventional methods for preparation of terephthalaldehyde known to the art are hydrolysis method of intermediate prepared by chlorination of p-xylene, and hydrogenation method of dimethyl terephthalate. However, these conventional methods are not suitable for economical mass production since their processes are complicated and should be carried out under high pressure and environment-unfriendly conditions.

In order to solve these problems, there has been a continuous study for mass production of terephthalaldehyde by gas-phase-oxidizing p-xylene with molecular oxygen.

For example, Japanese Patent Publication No. 47-002086 discloses a complex oxide catalyst having the ratio range of W:Mo of from 1:1 to 20:1. And, Japanese Patent Publication No. 48-097830 discloses a catalyst comprising V and Rb or Cs. U.S. Pat. No. 3,845,137 discloses a catalyst consisting of two components, W and Mo, and one or more components selected from the group consisting of Ca, Ba, Ti, Zr, Hf, Tl, Nb, Zn, and Sn. Also, U.S. Pat. No. 4,017,547 discloses a catalyst consisting of Mo oxide, W oxide or silicotungstic acid and Bi oxide. However, the industrial practical uses of these catalysts have been limited due to the low selectivity and yield of terephthalaldehyde.

Also, U.S. Pat. No. 5,324,702 discloses a catalyst comprising a first component selected from the group consisting of Fe, Zn, Zr, Nb, In, Sn, Sb, Ce and Bi, and a second component selected from the group consisting of V, Mo and W, wherein the first and second components are distributed on a deboronized borosilicate crystal molecular sieve by chemical vapor deposition (CVD). This catalyst shows relatively higher conversion rate to p-xylene, and relatively higher yield of terephthalaldehyde, than conventional catalysts. However, the catalyst also has a limitation in increasing the selectivity of various by-products, and so was difficult to separate and purify it.

Moreover, U.S. Pat. No. 6,458,737 discloses a catalyst comprising a major component of W, and one or more components selected from the group consisting of Sb, Fe, Co, Ni, Mn, Re, Cr, V, Nb, Ti, Zr, Zn, Cd, Y, La, Ce, B, Al, Tl, Sn, Mg, Ca, Sr, Ba, Li, Na, K, Rb and Cs. The catalyst can provide a high yield of terephthalaldehyde enough to have industrial applicability. However, the catalyst also has a limitation in the separation and purification since the selectivity of terephthalaldehyde is not high compared with high conversion rate of p-xylene. Further, the catalyst has problems in heat stability and life since it comprises Sb component which is sublimated and lost at high temperature.

In short, in case of using these conventional catalysts, the yield of terephthalaldehyde is low. Or, the selectivity is low even though the yield is high. Thus, the separation and purification are difficult. Also, it is difficult to prepare the catalysts to have homogeneous composition and performance since they use complex oxide having multiple components. Further, the catalysts comprise components having low heat stability, and so have short life span, and thus their industrial practical uses have been limited.

On the other hand, Korean Patent Application No. 10-2004-0089376 filed by the present inventor disclosed a single-component catalyst comprising tungsten oxide, and fire-resistant inorganic carrier as optional component. The catalyst has advantages that it is easy to make it homogenous, and it has higher selectivity and yield of terephthalaldehyde than conventional complex oxide having multiple components. However, the catalysts having higher selectivity or terephthalaldehyde are still required

DISCLOSURE OF THE INVENTION

Considering all the above problems, the object of the present invention is to provide a method for preparing a catalyst for partial oxidation of methylbenzenes, which can lower the reaction temperature based on equivalent yield in the process of preparing corresponding aromatic aldehydes from the methylbenzenes.

To attain the above objection, the present invention provides a novel method for preparing a catalyst of the formula (1),

wherein, W represents tungsten atom, O represents oxygen atom x represents a value determined by oxidative state of W, for partial oxidation of methylbenzenes, comprising:

(a) a step of preparing tungsten oxide slurry by wet milling;

(b) a step of supporting the slurry obtained in the step (a) on inorganic carrier;

(c) a step of drying the catalyst obtained in the step (b); and (d) a step of calcining the dried catalyst obtained in the step (c).

The term "methylbenzene" used herein means any compound having one or more methyl groups directly joined to the benzene ring, and may include methylbenzenes containing 8 to 10 carbon atoms, such as p-xylene, o-xylene, m-xylene, psudocumene, mesitylene, and durene, but is not limited thereto.

The use of catalyst for partial oxidation is to prepare corresponding aromatic aldehydes from methylbenzenes. For example, the method for preparing aromatic aldehydes may comprise preparing terephthalaldehyde and p-tolualdehyde from p-xylene; phthalaldehyde and o-tolualdehyde from o-xylene; isophthalaldehyde and m-tolualdehyde from m-xylene; 2-methylterephthalaldehyde, 2,4-dimethylbenzaldehyde, 2,5-dimethylbenzaldehyde, and 3,4-dimethylbenzaldehyde from psuedocumene; 3,5-dimethylbenzaldehyde, 5-methylisophthalaldehyde and 1,3,5-triformylbenzene from mesitylene; and 2,5-dimethylterephthalaldehyde, 4,5-dimethylphthalaldehyde, 2,4,5-trimethylbenzaldehyde, 2,4,5-triformyltoluene and 1,2,4,5-tetraformylbenzene from durene; but is not limited thereto. Particularly, the catalyst for partial oxidation of methylbenzenes prepared by the present invention is suitable for preparing terephthalaldehyde from p-xylene.

BEST MODE FOR CARRYING OUT THE INVENTION

Figure 1:
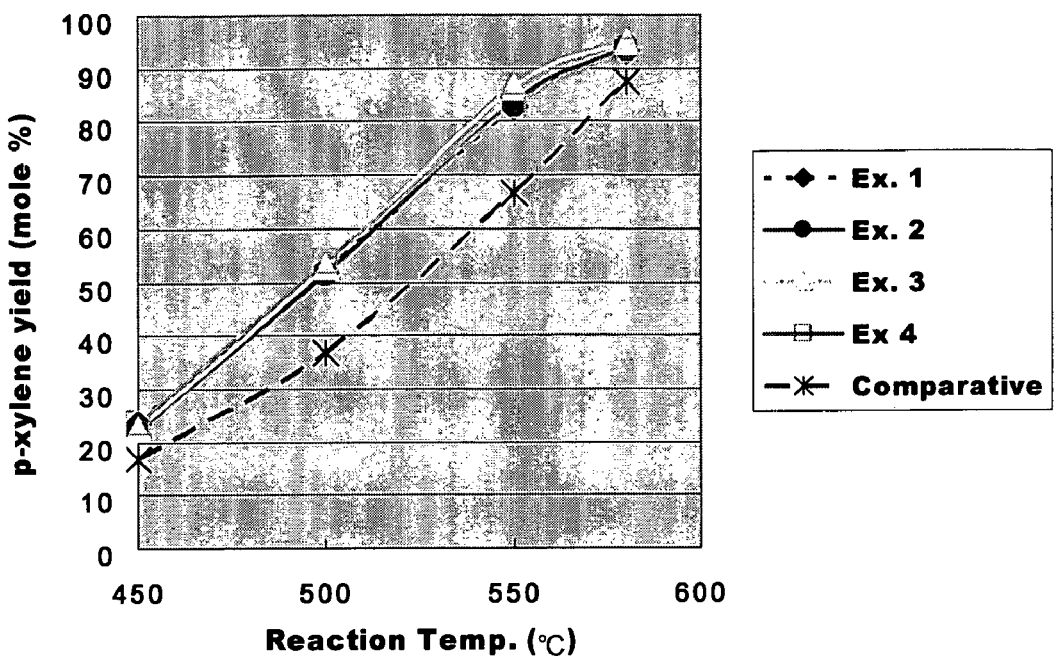
FIG. 1 is a graph representing p-xylene conversion rate depending on reaction temperature of the catalysts for partial oxidation of methylbenzenes of Example 1 to 4 and Comparative Example 1 according to the present invention.

Hereinafter, each step of the present invention will be described more specifically.

The step (a) of the present invention is a step of preparing tungsten oxide slurry by mixing tungsten oxide and dispersant, and wet-milling the mixture by using a milling apparatus.

The above tungsten oxide can be prepared by preparing a slurry or solution and evaporating the slurry or solution, followed by drying and calcining. The raw materials of tungsten used for preparing the tungsten oxide are not particularly limited, and ammonium salts, carbides, chlorides, sulfides, silicides, organic acid salt, or heteropolyacid in addition to tungsten oxide, preferably tungsten oxide or ammonium metatungstate may be used.

Alcohol may be used as dispersant for tungsten oxide. As for alcohol, methanol, ethanol or iso-propanol may be used. Considering malfeasance of the process, it is preferable to use ethanol.

There is no specific limitation in the amount of dispersant to tungsten oxide, but 2 to 3 times to the weight of tungsten oxide is generally preferred since the preparation time during the supporting step may be increased when the amount is large, and it is difficult to input it into a pore of carrier when the amount is small.

The apparatuses for wet-milling the mixed solution of tungsten oxide and alcohol are not particularly limited. Any conventional milling apparatus can be used. When a ball mill apparatus for pulverizing is used, the pulverizing and mixing effects can be increased. When a ball mill apparatus is used, the milling effect can be increased by adjusting the size of ball.

The step (b) of the present invention is a step of supporting the tungsten oxide slurry obtained in the step (a) on inorganic carrier.

Among the above inorganic carrier, it is preferable to use one or more fire-resistant inorganic carrier selected from the group consisting of α-alumina, silica, titania, zirconia and silicon carbide.

The shape of the inorganic carrier is not particularly restricted, and spheres, pellets, rings, or a honeycomb, etc. can be selectively used.

The method for supporting the tungsten oxide slurry in inorganic carrier is not particularly restricted, but it is preferable to use impregnation method since it can increase the amount of supported material, and the homogeneity of catalyst, compared with coating method.

Also, the step (b) is preferable to be carried out under reduced pressure or vacuum condition since the reduced pressure or vacuum of the container having carrier can support the active ingredient on the inner surface of the catalyst.

The steps (c) and (d) of the present invention is steps of drying and calcining the prepared catalyst.

The method or atmosphere in which the above drying and calcining are carried out is not particularly restricted. The drying method may be vacuum dry, refrigeration dry, spray dry, microwave dry, rotary evaporation, air dry, etc. These methods can be carried out in air, oxygen-rich or oxygen-lean atmosphere, reducing atmosphere, inert gas atmosphere, or vacuum.

The temperature condition of the above steps (c) and (d) is also particularly restricted, but preferable dry temperature is 80~200° C., and calcinations temperature is 300~700° C. When the above dry temperature is less than 80° C., dry efficiency may be decreased, when the dry temperature is more than 200° C., catalyst performance may be decrease. When the above calcinations temperature is less than 300° C., it is difficulty to remove the reaction impurities, when the temperature is more than 700° C., the morphology of the catalyst may be deformed.

The shape of the prepared catalyst is not particularly restricted, but spheres, pellets, rings, honeycomb, etc. can be selectively used. Further, not only molded products but also oxide or hydroxide powders, gels, sols, and so on can be selectively used.

Hereinafter, the present invention will be more specifically illustrated by the following examples. However, the following examples should not be construed as limiting the scope of the present invention in any way.

EXAMPLE 1

An aqueous solution of ammonium metatungstate (2 mmol/g) as tungsten raw material was prepared. The aqueous solution was heated under stirring in water bath to carry out evaporation. Thus resulting product was dried at 120° C. for 18 hours, followed by calcinating at 650° C. under air atmosphere for 2 hours to obtain tungsten oxide.

The above tungsten oxide of 20 g was poured into 250 ml of PP bottle, and ethanol of 60 g as dispersant was added thereto and mixed. Zirconia ball was added into the mixture, and the wet-milling was carried out for 3 hours by using oscillator milling apparatus.

The above slurry was poured into a container including α-alumina carrier, SA5205 60 g (Norton Co., 5 mm of sphere), which was preheated to 120° C. Thus obtained product was heated under stirring in water bath to carry out evaporation. Thus supported carrier was dried on 120° C. for 18 hours, and calcining treatment was carried out under air atmposhere on 650° C. for 2 hours to obtain the final catalyst. The weigh percent of the WOx component was 18.7% of the total weight of the catalyst, and thus the final catalyst has the composition of 18.7 wt % WOx/SA5205.

The above catalyst (60 g) was poured into a conventional continuous reactor, and the reaction was carried out under the following conditions:

Reaction pressure: normal pressure
The ratio of gas reactant (volume ratio):
p-xylene/oxygen/nitrogen=0.25/6.25/93.5 (oxygen/p-xylene=25)
Feeding rate of gas reactant: 1.2 L/min
Space velocity (GHSV): 1500 hr$^{-1}$
Reaction temperature: 450, 500, 550, and 580° C.

The following examples and comparative example are carried out under the same conditions as the above unless otherwise described. However, the space velocity may be varied depending on the kind of carrier and the amount of supported material. The reaction results are shown in Table 1 and FIGS. 1 to 3.

EXAMPLE 2

The catalyst was prepared in the same manner as Example 1 except that the obtained catalyst having the composition of 25.0 wt % WOx/SA5205 was prepared by using tungsten oxide of 25 g.

EXAMPLE 3

The catalyst was prepared in the same manner as Example 1 except that the obtained catalyst having the composition of 27.1 wt % WOx/SA5205 was prepared by using tungsten oxide of 30 g.

EXAMPLE 4

The catalyst was prepared in the same manner as Example 1 except that the obtained catalyst having the composition of 29.8 wt % WOx/SA5218 was prepared by using tungsten oxide of 30 g and α-alumina carrier, SA5218 (Norton Co., 5 mm of sphere).

COMPARATIVE EXAMPLE

An aqueous solution of ammonium metatungstate of 54.0 g was diluted with water of 60 ml. The □α-alumina carrier, SA5205 60 g (Norton Co., 5 mm of sphere), which was preheated to 120° C., was poured into the above solution. Thus obtained product was heated under stirring in water bath to carry out evaporation. The supported carrier was dried at 120° C. for 18 hours, and calcining treatment was carried out under air atmposhere at 650° C. for 2 hours to obtain the final catalyst. The weight percent of the finally obtained catalyst was 24.7% of the total weight of the catalyst, and thus the catalyst having the composition of 24.7 wt % WOx/SA5205 was obtained.

The conversion rate, selectivity and one-pass yield of the reaction, taking by-products into account, are defined by the follows formulae:

Conversion rate (mole %)=(the number of mole of the reacted starting compound/the number of mole of the fed starting compound)×100    [Formula 1]

Selectivity (mole %)=(the number of mole of each product compound/the number of mole of the reacted starting compound)×(the number of carbon atom of each product compound/the number of carbon atom of the fed starting compound)×100    [Formula 2]

One-pass yield (mole %)=(the number of mole of each product compound/the number of mole of the fed starting compound)×(the number of carbon atom of each product compound/the number of carbon atom of the fed starting compound)×100    [Formula 3]

TABLE 1

| | Reaction Temp. (° C.) | Conversion Rate (mole %) | Selectivity (mole %) | | One-pass yield (mole %) | |
|---|---|---|---|---|---|---|
| | | | TPAL | PTAL | TPAL | PTAL |
| Ex. 1 | 450 | 23.6 | 60.6 | 5.0 | 14.3 | 1.2 |
| | 500 | 51.7 | 78.7 | 4.3 | 40.7 | 2.2 |
| | 550 | 82.9 | 73.5 | 3.6 | 60.9 | 3.0 |
| | 580 | 93.3 | 64.8 | 3.1 | 60.5 | 2.9 |
| Ex. 2 | 450 | 22.3 | 60.0 | 4.7 | 13.4 | 1.0 |
| | 500 | 51.4 | 79.1 | 4.1 | 40.7 | 2.1 |
| | 550 | 83.7 | 74.0 | 3.1 | 61.9 | 2.6 |
| | 580 | 93.9 | 66.9 | 2.8 | 62.8 | 2.6 |
| Ex. 3 | 450 | 22.5 | 58.0 | 5.1 | 13.1 | 1.1 |
| | 500 | 52.7 | 79.6 | 4.0 | 41.9 | 2.1 |
| | 550 | 86.6 | 80.8 | 2.7 | 70.0 | 2.3 |
| | 580 | 94.9 | 71.8 | 2.4 | 68.1 | 2.3 |
| Ex 4 | 450 | 23.7 | 59.1 | 4.8 | 14.0 | 1.1 |
| | 500 | 54.0 | 79.2 | 4.0 | 42.8 | 2.2 |
| | 550 | 82.9 | 76.4 | 3.0 | 63.3 | 2.5 |
| | 580 | 93.4 | 67.0 | 2.5 | 62.6 | 2.3 |
| Comparative Ex. 1 | 450 | 16.9 | 67.2 | 4.3 | 11.4 | 0.7 |
| | 500 | 36.7 | 80.3 | 3.7 | 29.5 | 1.4 |
| | 550 | 66.6 | 79.0 | 3.4 | 52.6 | 2.3 |
| | 580 | 87.4 | 74.8 | 3.3 | 65.4 | 2.9 |

TPAL: terephthalaldehyde;
TAL: p-tolualdehyde

Figure 2:
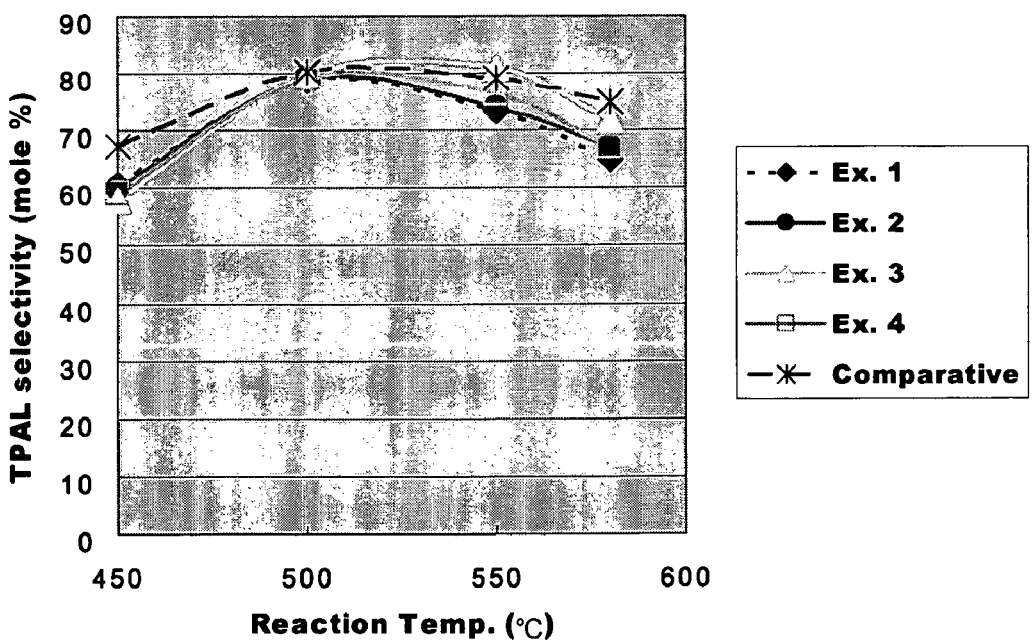
FIG. 2 is a graph representing terephthal aldehyde (TPAL) selectivity depending on reaction temperature of the catalysts for partial oxidation of methylbenzenes of Example 1 to 4 and Comparative Example 1 according to the present invention.
Figure 3:
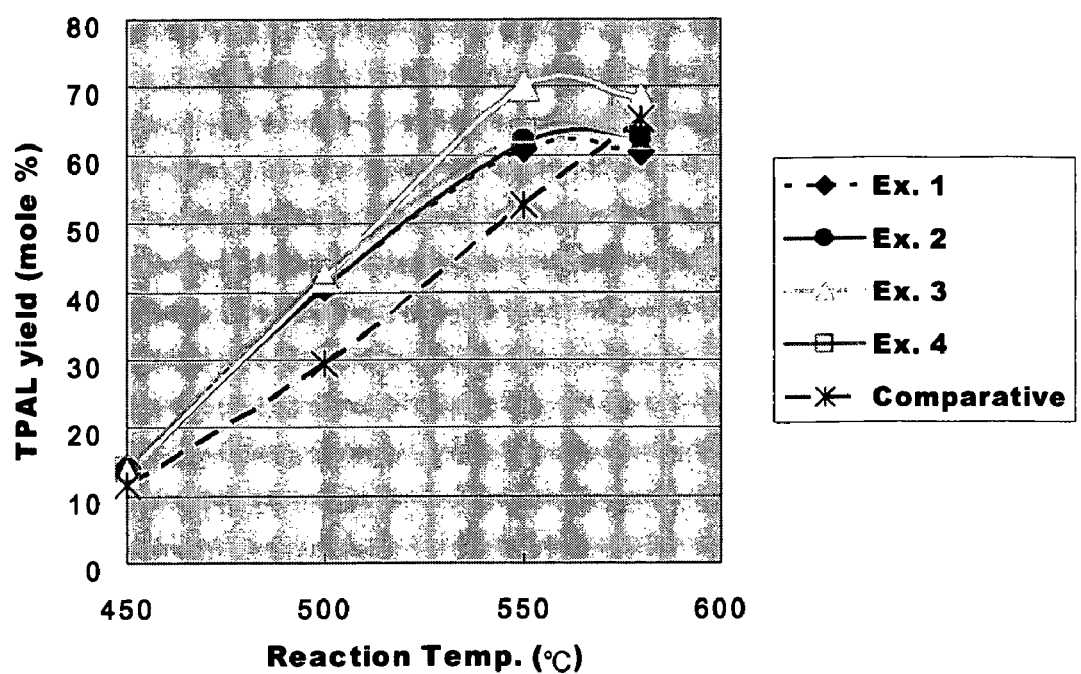
FIG. 3 is a graph representing terephthal aldehyde (TPAL) yield depending on reaction temperature of the catalysts for partial oxidation of methylbenzenes of Example 1 to 4 and Comparative Example 1 according to the present invention.

Hereinafter, the results shown in Table 1 and FIGS. 1 to 3 will be discussed in detail. As shown in FIG. 1, Examples 1 to 4 according to the present invention show superior p-xylene conversion rate in the whole range to the Comparative Example by using a conventional impregnation method. There is no significant difference in the maximum selectivity of TPAL between the Examples and the Comparative Example. The Comparative Example shows a little higher selectivity of TPAL in the high temperature range than the Examples. However, as shown in FIG. 2, Example 3 having the high amount of supported material can maintain very high selectivity of TPAL in the high temperature range corresponding to the Comparative Example. Also, as shown in FIG. 3, the catalyst of the Comparative Example shows relatively high yield of more than 60% at the temperature of 580° C. However, the catalyst of Examples 1 to 4 shows high yield corresponding to that of the Comparative Example at the temperature of 550° C. Therefore, it is confirmed that the catalyst prepared by the present method can reduce the reaction temperature to obtain an equivalent level of TPAL yield to the conventional method due to the increase of the conversion rate.

INDUSTRIAL APPLICABILITY

The catalyst prepared by the present method can reduce the reaction temperature on the basis of equivalent yield in the preparation of corresponding aromatic aldehyde from methylbenzenes since the catalyst has increased the surface areas compared to the conventional one, and so has high conversion rate.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A method for partially gas-phase oxidizing methylbenzenes using a catalyst of the formula (1), WOx wherein, W represents tungsten atom, O represents oxygen atom, and x represents a value determined by oxidative state of W, characterized in that the catalyst is prepared by a process comprising:
(a) a step of preparing tungsten oxide slurry by wet milling;
(b) a step of supporting the slurry obtained in the step (a) on inorganic carrier;
(c) a step of drying the catalyst obtained in the step (b); and
(d) a step of calcining the dried catalyst obtained in the step (c).

2. The method according to claim 1, wherein the step (a) is carried out by mixing tungsten oxide and alcohol as dispersant, and wet milling the mixture by using a milling apparatus.

3. The method according to claim 2, wherein the milling apparatus is ball mill apparatus.

4. The method according to claim 2, wherein the alcohol is one or more selected from the group consisting of methanol, ethanol and iso-propanol.

5. The method according to claim 1, wherein the step (c) is carried out at a temperature of 80 to 200° C.

6. The method according to claim 1, wherein the step (d) is carried out at a temperature of 300 to 700° C.

7. The method according to claim 1, wherein the gas-phase oxidation of methylbenzenes is carried out at a normal pressure and a temperature of 450 to 580°C.

* * * * *